United States Patent [19]
Yoon

[11] Patent Number: 5,995,299
[45] Date of Patent: Nov. 30, 1999

[54] COMPACT ZOOM LENS SYSTEM

[75] Inventor: Yong-Gyu Yoon, Kyeongsangnam-do, Rep. of Korea

[73] Assignee: Samsung Aerospace Industries, Ltd., Rep. of Korea

[21] Appl. No.: 09/133,393

[22] Filed: Aug. 13, 1998

[51] Int. Cl.⁶ ................................................. G02B 15/14
[52] U.S. Cl. .......................... 359/692; 359/683; 359/691
[58] Field of Search .................................. 359/692, 708, 359/755, 756, 757, 793, 795, 676, 683, 691, 687, 688

[56] References Cited

U.S. PATENT DOCUMENTS

| | | | |
|---|---|---|---|
| 4,679,913 | 7/1987 | Sato et al. | 350/423 |
| 4,682,860 | 7/1987 | Tanaka et al. | 350/423 |
| 4,830,476 | 5/1989 | Aoki | 350/427 |
| 5,243,466 | 9/1993 | Lee | 359/692 |
| 5,327,290 | 7/1994 | Fukushima et al. | 359/692 |
| 5,381,270 | 1/1995 | Cho | 359/692 |
| 5,570,235 | 10/1996 | Yoneyama | 359/692 |
| 5,726,811 | 3/1998 | Kang et al. | 359/692 |
| 5,729,392 | 3/1998 | Yoon | 359/692 |
| 5,786,945 | 7/1998 | Aoki et al. | 359/692 |
| 5,796,527 | 8/1998 | Ohtake | 359/692 |
| 5,798,873 | 8/1998 | Hoshi | 359/692 |
| 5,844,725 | 12/1998 | Itoh | 359/692 |

OTHER PUBLICATIONS

Abstract: Two–Group Lens, Japanese Patent No. JP 2190812, 1990.
Abstract: Zoom Lens, Japanese Patent No. 05134180, 1993.
Abstract: Compact Zoom Lens, Japanese Patent No. 06130298, 1994.
Abstract: Small Variable Power Lens, Japanese Patent No. 06281861, 1994.
Abstract: Small Zoom Lens, Japanese Patent No. 07120675, 1995.
Abstract: Zoom Lens, Japanese Patent No. 08021954, 1996.

*Primary Examiner*—Georgia Epps
*Assistant Examiner*—David N. Spector
*Attorney, Agent, or Firm*—Fish & Richardson P.C.

[57] ABSTRACT

A compact zoom lens system includes, when viewed from an object side, a first lens group with positive refractive power and a second lens group. The magnification of the system can be changed by varying a distance between the first lens group and the second lens group, wherein the following condition is satisfied:

$$Lt/ft < 0.78$$

wherein:
Lt is the distance between the surface of lens closest to the object and the image plane; and
ft is the focal length of the zoom lens system.

20 Claims, 18 Drawing Sheets

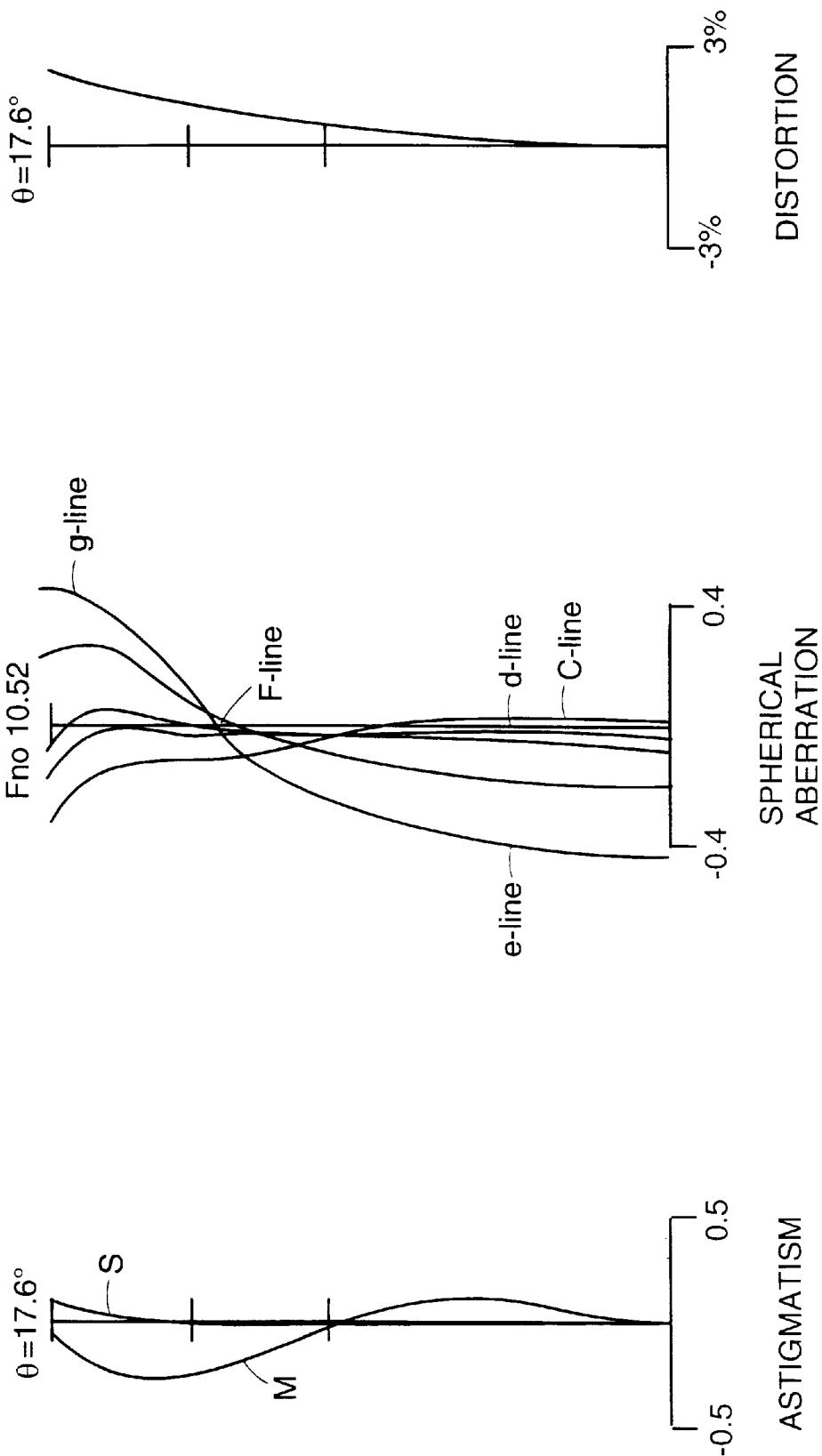

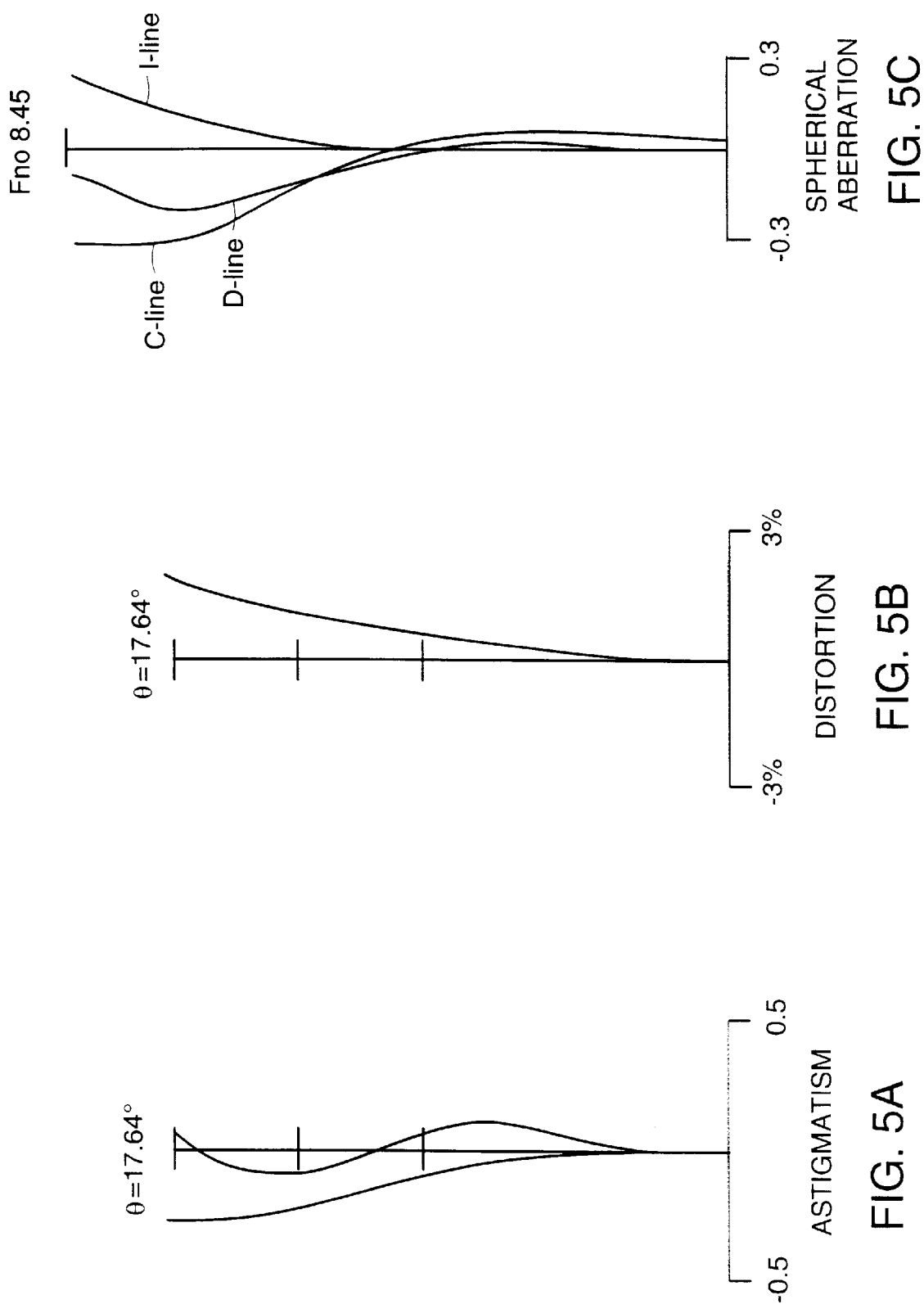

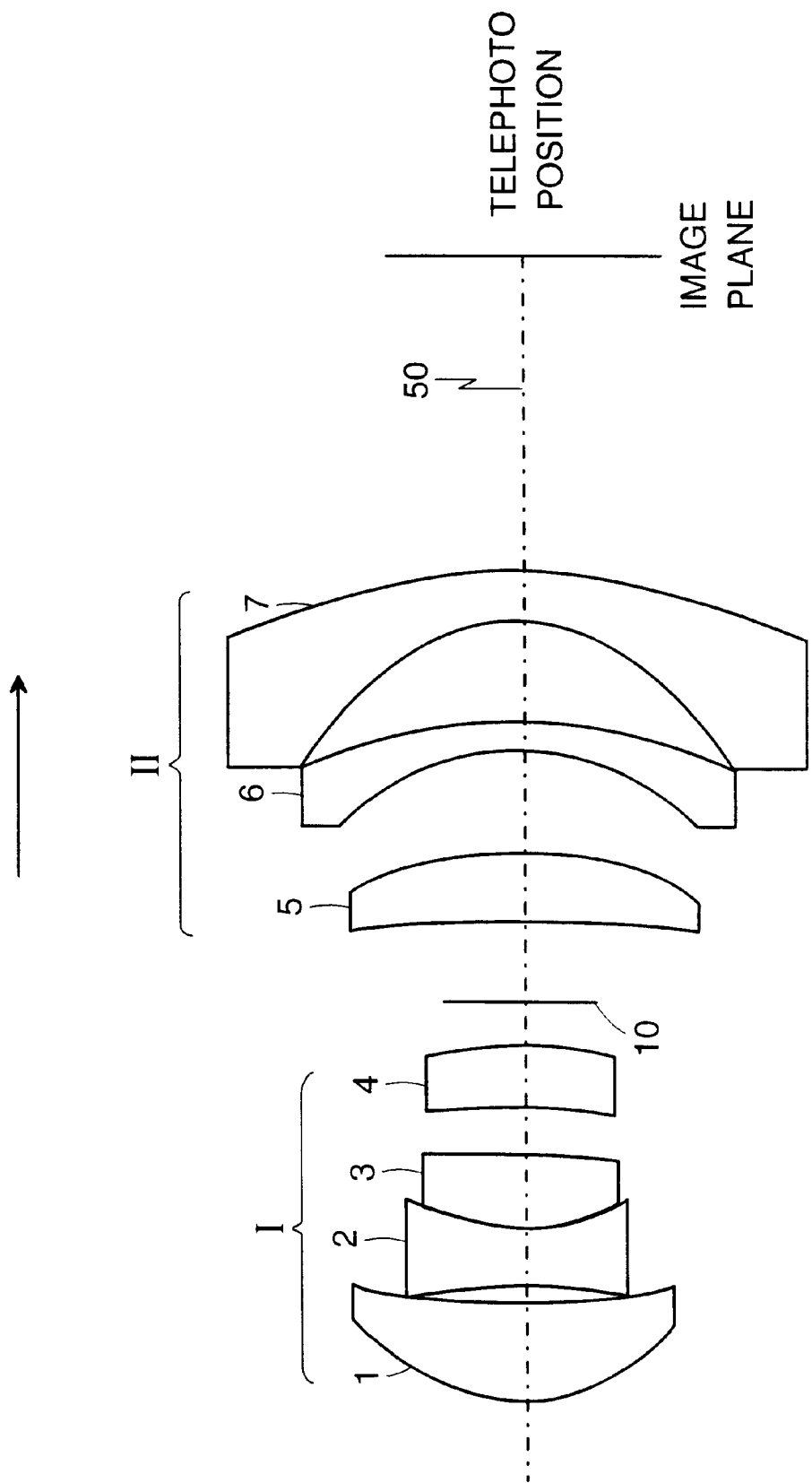

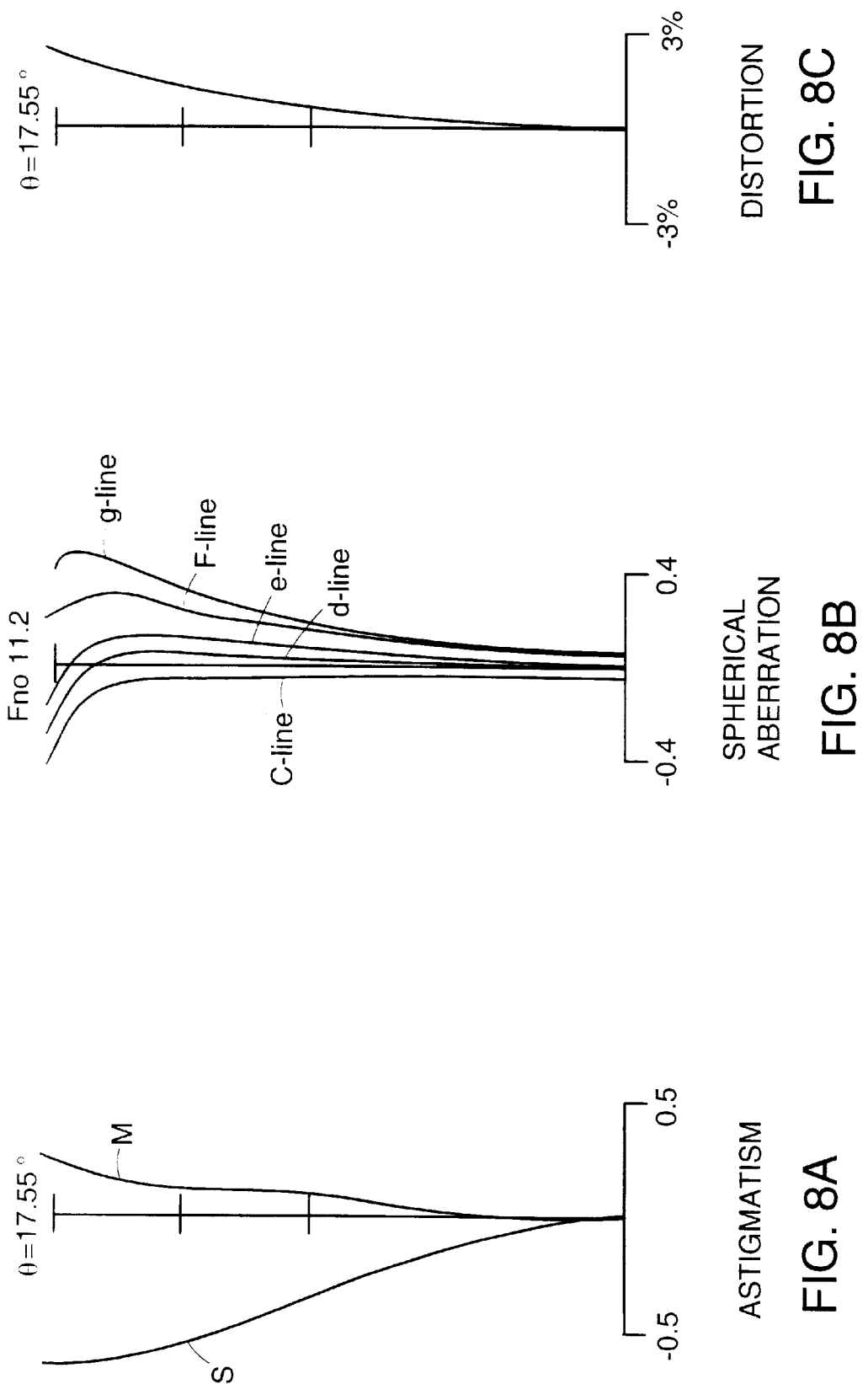

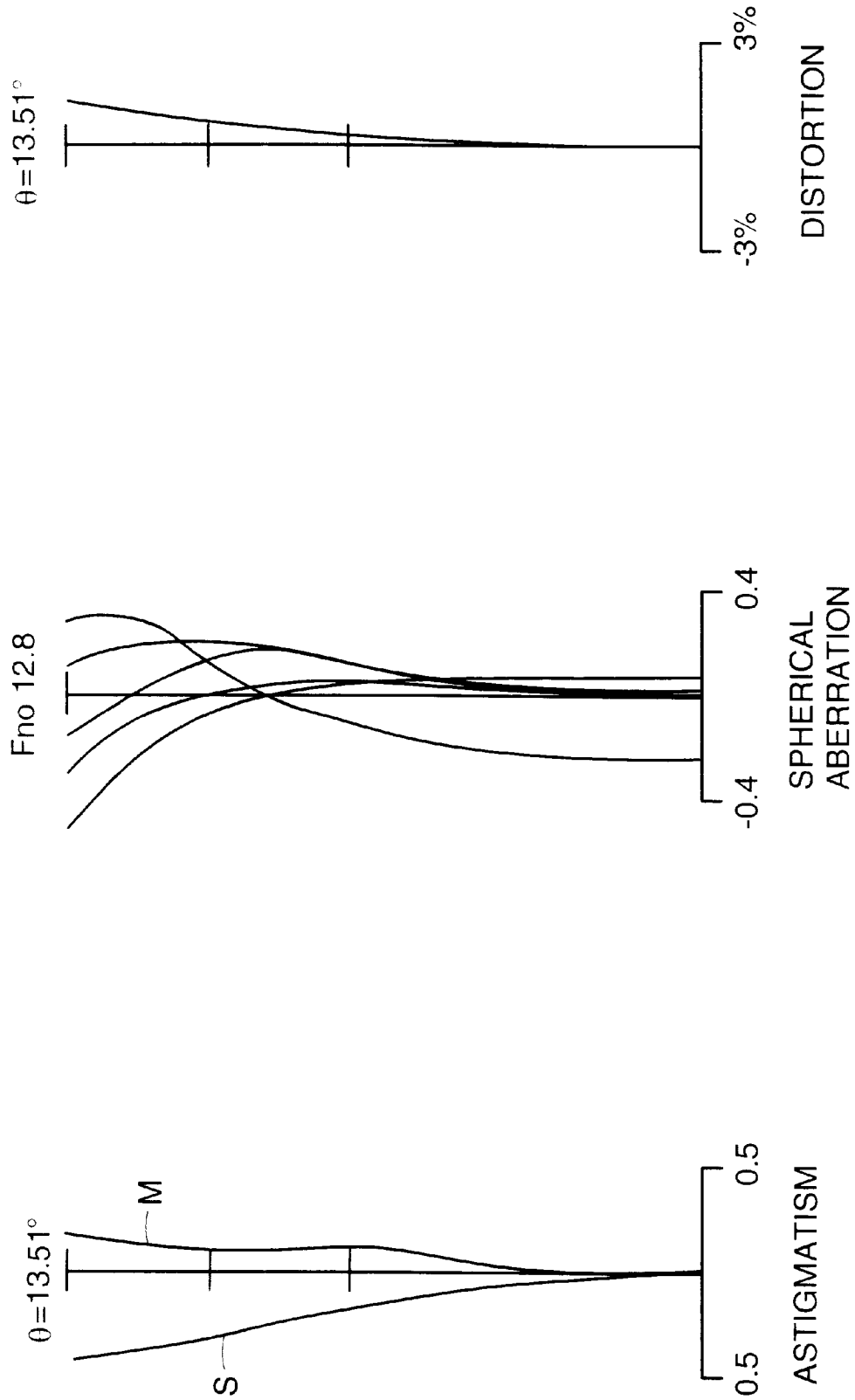

COMPACT ZOOM LENS SYSTEM

BACKGROUND OF THE INVENTION (a) Field of the Invention

The present invention relates to a zoom lens system, and more particularly, to a zoom lens system which is compact in size while providing exceptional optical performance.

(b) Description of the Related Art

Lens shutter cameras, video cameras, etc. are becoming increasingly smaller, requiring short zoom lens systems.

Zoom lens systems for compact cameras typically include, when viewed from an object, a first lens group with a positive refractive power and a second lens group with a negative refractive power. The magnification of the zoom lens system is varied by changing the distance between the first lens group and the second lens group.

Such zoom lens systems are disclosed in Japanese Publications Nos. Hei 2-190812, Hei 5-134180, Hei 6-130298, Hei 6-281861, Hei 7-120675, and Hei 8-219542, and in U.S. Pat. No. 5,327,290.

The zoom lens system of Japanese Publications No. Hei 2-190812, Hei 6-130298 and Hei 8-21954 have a viewing angle between 53° and 58° and a focal length greater than 39 mm at the wide-angle position. This increases the focal length at a telephoto position, making it difficult to reduce the total length of the zoom lens system.

The zoom lens system of Japanese Publication No. Hei 2-190812 has a first lens group with five lenses and a second lens group with four lenses; the zoom lens systems of Japanese Publications Nos. Hei 2-134180 and Hei 7-120675include a first lens group with five lenses; and the zoom lens system of Japanese Publication No. Hei 6-281861 includes an aperture positioned inside of a first lens group.

In the above mentioned zoom lens systems, the lens groups are divided into forward and rear lens groups based on their position relative to the aperture. The lens groups are simultaneously moved to adjust the focus while the aperture remains stationary. Accordingly, this operation of the lens system is complicated and difficult to control, and the complexity of the mechanism increases the overall manufacturing costs.

Also, such zoom lens systems have a telephoto ratio of 0.9, making it difficult to reduce the total length of the system.

SUMMARY OF THE INVENTION

It is therefore an object of the present invention to provide a compact zoom lens system which has a variable magnification ratio of 2.0 while simultaneously providing exceptional optical performance for all magnification settings. In contrast to other zoom lenses, the zoom lens systems of the invention are placed in a wide-angle position by increasing the distance between a first lens group and a second lens group, and placed in a telephoto position by decreasing the distance between the first lens group and the second lens group.

It is another object of the present invention to provide a zoom lens system which is compact and has a telephoto ratio of less than 0.78.

To achieve these objects and other advantages, the invention provides a compact zoom lens system which includes, starting from the object side, a first lens group with a positive refractive power and a second lens group with a negative refractive power. The magnification of the system can be changed by varying a distance between the first lens group and the second lens group, wherein the following condition is satisfied:

$$Lt/ft < 0.78$$

wherein:

Lt is the distance between the surface facing the object of the lens closest to the object and the image plane; and ft is the focal length of the zoom lens system.

It is to be understood that both the foregoing general description and the following detailed description are exemplary and are in no way intended to limit the scope of the claimed invention.

BRIEF DESCRIPTION OF THE DRAWINGS

Further objects and other advantages of the present invention will be apparent from the following description in conjunction with the attached drawings, in which:

FIG. 2 shows aberration curves of the compact zoom lens system of FIG. 1a;

FIG. 3 shows aberration curves of the compact zoom lens system of FIG. 1b;

FIG. 5 shows aberration curves of the compact zoom lens system according to the second embodiment of the present invention at the telephoto position;

FIG. 6b is a side view of the compact zoom lens system of FIG. 6a at the telephoto position; the arrow above lens group II indicates the motion of lens group II, relative to lens group I, required to achieve the wide-angle position shown in FIG. 6A;

FIG. 7 shows aberration curves of the compact zoom lens system of FIG. 6a;

FIG. 8 shows aberration curves of the compact zoom lens system of FIG. 6b;

FIG. 10 shows aberration curves of the compact zoom lens system according to the fourth embodiment of the present invention at the telephoto position;

FIG. 14 shows aberration curves of the compact zoom lens system of FIG. 13a.

DETAILED DESCRIPTION OF THE PREFERRED EMBODIMENTS

Figure 1A:
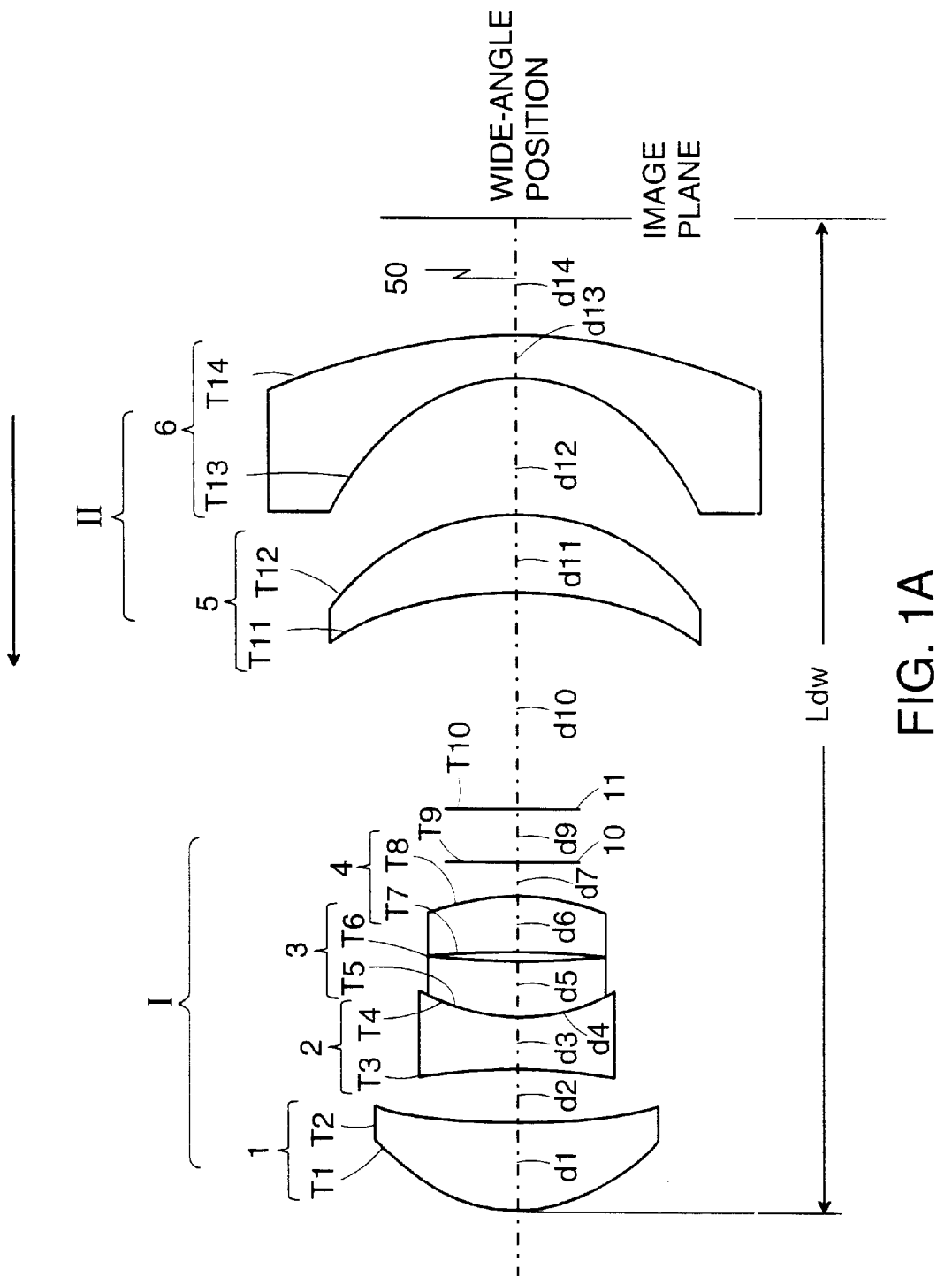
FIG. 1a is a side view of a first embodiment of a compact zoom lens system of the present invention at a wide-angle position; the arrow above lens group II indicates the motion of lens group II, relative to lens group I, required to achieve th telephoto position shown in FIG. 1B.
Figure 1B:
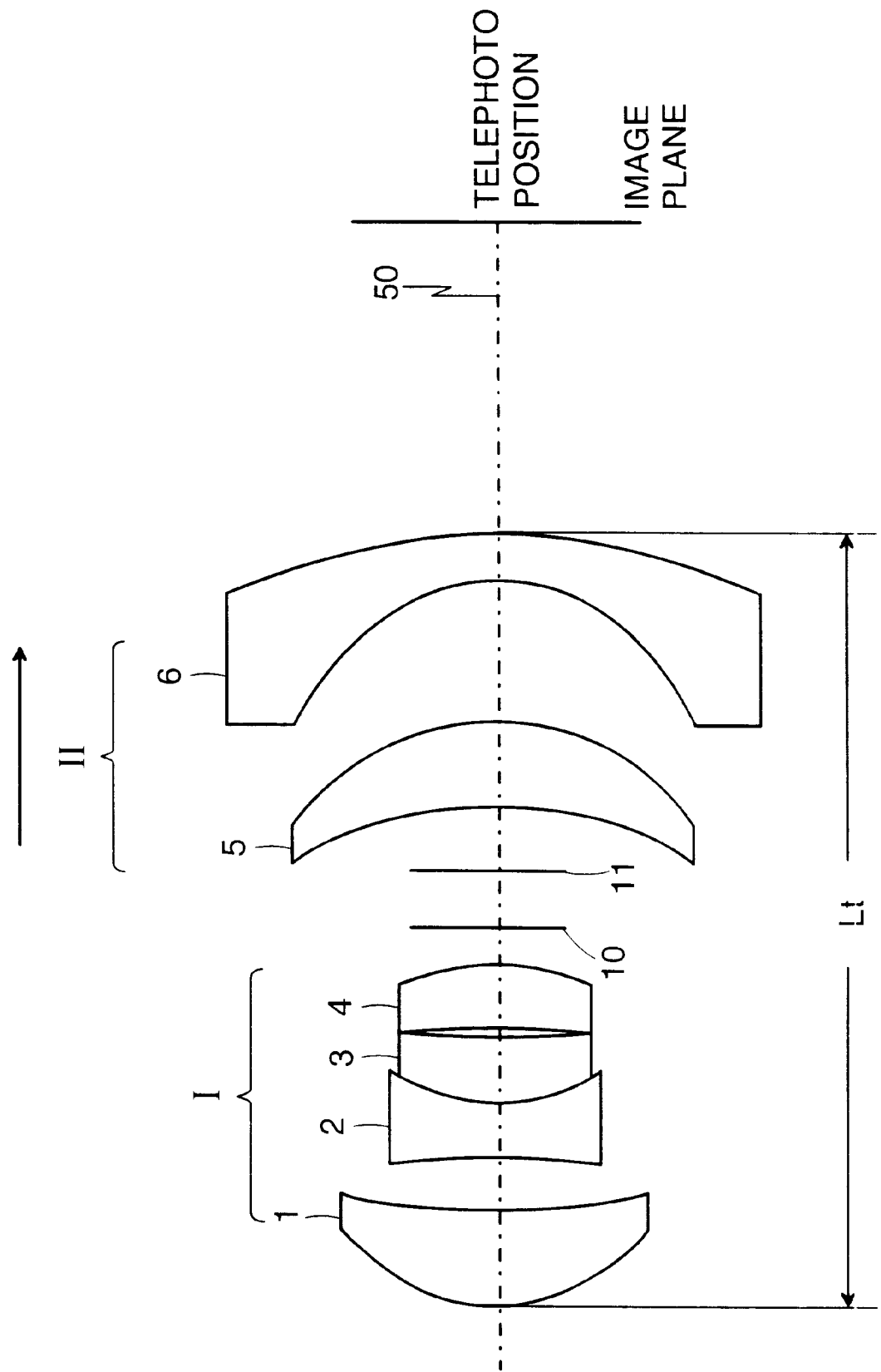
FIG. 1b is a side view of the compact zoom lens system of FIG. 1a at a telephoto position; the arrow above lens group II indicates the motion of lens group II, relative to lens group I, required to achieve the wide-angle position shown in FIG. 1A.

Preferred embodiments of the present invention will be described in detail with reference to the accompanying drawings.

A compact zoom lens system according to preferred embodiments of the present invention includes, as shown in FIGS. 1a, 1b, 6a, 6b, 13a, and 13b, when viewed from the object side, a first lens group I with a positive refractive power and a second lens group II with a negative refractive power. The first and second lens groups I and II are spaced apart and arranged on the same optical axis 50. An aperture 10 is positioned between the first lens group I and the second lens group II, and a mirror 11 for blocking harmful light may be positioned on the side of the image plane of the aperture 10.

The first lens group I includes three lenses with a positive refractive power and a fourth lens with a negative refractive power. The second lens group II includes a lens having a positive refractive power and at least one lens having a negative refractive power. At least three surfaces of the first lens group I and the second lens group II are aspherical.

The magnification of the zoom lens system is changed by decreasing the distance between the first lens group I and the second lens group II when zooming from the wide-angle position to the telephoto position The operation of the above compact zoom lens system will be described hereinafter.

To have a magnification ratio of 2.0 and a telephoto ratio of less than 0.78, while maintaining a compact structure, the compact zoom lens system according to the present invention satisfies the following conditions:

$$Lt/ft<0.78 \qquad (1)$$

$$0.40<f1/fw<0.70 \qquad (2)$$

$$0.55<|f2|/f1<0.80 \qquad (3)$$

$$0.38<X/fw<0.52 \qquad (4)$$

$$0.55<Ldw/fw<0.75 \qquad (5)$$

$$0.45<Ldw/LY<0.65 \qquad (6)$$

$$0.28<|f2|/fw<0.46 \qquad (7)$$

$$16.0<|f2|\times Zr<31.0 \qquad (8)$$

$$0.36<f1/LY<0.58 \qquad (9)$$

$$0.18<f1/ft<0.28 \qquad (10)$$

$$0.20<|f2|/LY<0.40 \qquad (11)$$

$$3.60<\beta t<5.0 \qquad (12)$$

$$0.11<dw/fw<0.25 \qquad (13)$$

$$0.55<fbw/LY<1.0 \qquad (14)$$

$$0.10<|f2|/ft<0.25 \qquad (15)$$

where,

Lt represents the distance along the optical axis 50 of the zoom lens system between the surface lens closest to the object of the first lens of the first group and the image plane at a telephoto position;

ft represents a focal length of the zoom lens system at the telephoto position;

f1 represents the focal length of the first lens group I;

fw represents the focal length of the zoom lens system at the wide-angle position;

f2 represents the focal length of the second lens group II;

X represents the length along the optical axis of the zoom lens system at the wide-angle position from the lens surface closest to the object of the first lens of the first group to the surface of the lens closest to the image side of the second group, minus the distance between the first and second lens groups I and II;

Ldw represents a distance along the optical axis of the zoom lens system between the lens surface closest to the object side of the first lens of the first group and the surface facing the image plane of the lens closest to the image plane of the second lens group at the wide-angle position;

LY represents the maximum height of image at the image plane;

fbw represents a back focal length at the wide-angle position;

Zr represents the zoom ratio;

βt represents transverse magnification of the zoom lens system at the telephoto position; and dw represents a distance between the first lens group I and the second lens group II at a wide-angle position.

condition (1) is set forth to obtain a minimum telephoto ratio. If condition (1) is satisfied, the total length of the zoom lens system becomes very short for a predetermined focal length of the zoom lens system at a telephoto position, thereby decreasing linear travel of the zoom lens system. Accordingly, the size of the zoom lens system can be readily decreased.

If the upper limit of condition (1) is exceeded, the telephoto ratio increases, making it difficult to decrease the size of the compact zoom lens system.

Conditions (2) and (3) relate to the distribution of the refractive power among the two lens groups to realize a small size for the compact zoom lens system while simultaneously attaining a magnification ratio of 2.0. If the upper limit of condition (2) is exceeded, the second lens group II approaches the image plane, making it difficult to obtain a suitable back focal length. The total length of the zoom lens system increases at the same time, which makes it is difficult to decrease the size of the zoom lens system.

If the lower limit of condition (2) is not met, the total length of the zoom lens system decreases and can therefore be made compact. However, the refractive power of each lens group increases substantially, making it difficult to improve the peripheral performance of the zoom lens system and to compensate for aberrations.

If the upper limit of condition (3) is exceeded, the outside diameter of is 5 the second lens group II increases, making it difficult to obtain a magnification ratio of 2.0. If the lower limit of condition (3) is not met, the distortion of a positive refractive power at the telephoto position increases.

Condition (4) is set forth to make the zoom lens system more compact and to provide a camera with the zoom lens system easier to carry. The distance between the first lens group I and the second lens group II can be reduced to a minimum distance which still satisfies condition (4), making the zoom lens system very short.

Conditions (5) and (6) relate to the distance from the surface of the lens surface closest to the object of the first lens of the first lens group to the surface facing the image plane of the lens closest to the image plane, taken along the optical axis 50 in the wide-angle position. If the upper limits of conditions (5) and (6) are exceeded, the total length of the system increases at the wide-angle position. If the lower limits of conditions (5) and (6) are not met, the thickness of the first lens group I (which is the distance between the surface facing the object of the first lens 1 and the surface the fourth lens 4 facing the image plane) must be small or the spacing between the first lens group I and the second lens group II should be decreased in order to decrease the length of the zoom lens system.

Conditions (7) to (10) are set forth to obtain a suitable back focal length and to compensate for aberrations.

Condition (7) relates to the refractive power of the second lens group II and determines the travel of the second lens group II when the magnification is changed from the wide-angle position to the telephoto position. Also, condition (7) makes it easier to decrease the size of the zoom lens system from when the second lens group II has four lenses, which is the third embodiment illustrated in FIGS. 6a and 6b.

If the upper limit of condition (7) is exceeded, aberrations can be easily corrected. However, the outside diameter of the second lens group II becomes rather large, causing the illumination level at the periphery of the lens system to decrease; furthermore, the outside diameter and the thickness at the periphery and the center of each lens of the second lens group II increases, as does the maximum travel of the second lens group II during zooming, making it difficult to reduce the size of the zoom lens system.

It would appear feasible to decrease the total length of the lens system by staying below the lower limit of condition (7). However, in this case, the residual aberrations of in the second lens group II increase, making it more difficult to rectify the aberrations with the first lens group I.

Condition (8) relates to the zoom ratio. If the upper limit of condition (8) is exceeded, the second lens group II has high refractive power. Here, when the refractive power of the second lens group II is less than the zoom ratio, the total length of the zoom lens system increases. This increases the travel of the second lens group II.

When the zoom ratio exceeds the upper limit of condition (8) and is larger than the focal length of the second lens group II, the magnification of the second lens group II must increase. This produces an asymmetrical coma which depends on the viewing angle, field curvature, distortion, etc.

However, when the magnification of the second lens group II is less than the lower limit of condition (8) and greater than the zoom ratio, the back focal length becomes short, although the travel of the second lens group II decreases due to the smaller refractive power and the shorter total length of the zoom lens system. The magnification of the second lens group II then increases to an unacceptable level.

When the zoom ratio is less than the lower limit determined by condition (8) and the focal length of the second lens group II, then the zoom lens system increases in length to unacceptable levels.

Condition (9) relates to the relation between the focal length of the first lens group I and the maximum image height. If the upper limit of condition (9) is exceeded, then a wide viewing angle is difficult to obtain. That is, the spacing between the first lens group I and the second lens group II must be increased to reduce the combined focal length of the first lens group I and the second lens group II, making it difficult to obtain a wide viewing angle.

As a result, the back focal length becomes extremely short, so that the diameter of lens of the second lens group II closest to the image plane becomes very large.

If the lower limit of condition (9) is not met, it is easy to reduce the combined focal length of the first lens group I and the second lens group II and to increase the back focal length. However, aberrations (e.g., spherical aberrations), are difficult to compensate, making it difficult to obtain a good optical performance.

Condition (10) relates to the refractive power of the first lens group I. If the upper limit of condition (10) is exceeded, the refractive power of the first lens group I decreases, so that the magnification of the second lens group II also decreases. This results in a short back focal length at the wide-angle position , making it difficult to obtain a sufficiently large back focal length.

The diameter of the lens of the second lens group II closest to the image side also increases, thereby increasing the size of the zoom lens system and thus also the size of the camera.

It would appear feasible to decrease the total length of the lens system by staying below the lower limit of condition (10). However, the refractive power of the first lens group I then increases, which in turn increases further the residual aberrations of the first lens group I, making it difficult to compensate for aberrations for all possible zoom ratios.

Condition (11) sets forth an optimum range of focal lengths to reduce the focal length of the second lens group II. If the upper limit of condition 11 is exceeded, then the focal length of the second lens group II increases substantially. Accordingly, since the distance between the first lens group I and the second lens group II must be increased to obtain a high zoom ratio, the size of the zoom lens system increases.

It would appear feasible to obtain a high zoom ratio by staying below the lower limit of condition (11). However, the negative refractive power of the second lens group II then increases to unacceptable levels, making it difficult to compensate for distortion and the Petzval sum.

Condition (12) relates to magnification by the second lens group II. If the upper limit of condition (12) is exceeded, then the refractive power of the second lens group II increases so that the first lens group I must also have a large refractive power. As a result, it becomes difficult to design a zoom lens with a large aperture ratio.

If the lower limit of condition (12) is not met, the refractive power of the second lens group II decreases, making the back focal length at the wide-angle position shorter. The refractive power of the second lens group II becomes then insufficient for the intended application.

Condition (13) relates to the distance between the first lens group I and the second lens group II at the wide-angle position. If the upper limit of condition 13 is exceeded, the size of the first lens group I increases, making it difficult to design a compact zoom lens system. If the lower limit of condition 13 is not met, the back focal length at the wide-angle position is inadequate. This latter problem increases the size of lenses of the second lens group II, making it again difficult to decrease the size of the compact zoom lens system.

Condition (14) is set forth to obtain a sufficiently large back focal length over the entire zoom range from the wide-angle position to the telephoto position. If the upper limit of condition (14) is exceeded, the total length of the zoom lens system increases. If the lower limit of condition (14) is not met, the surface of the lens closest to the image side approaches the image plane so that the lens closest has to have a large diameter. Also, the exit angle of the zoom lens system greatly increases, which decreases the amount of light reaching the image plane.

Condition (15) relates to the focal length of the second lens group II at the telephoto position. If the lower limit of condition (15) is violated, the travel of the second lens group II increases, thereby increasing the aberrations when zooming. Also, it is difficult to obtain adequate spacing between the first lens group I and the second lens group II. If the lower limit of condition (15) is not met, the aberrations of the zoom lens system increase. In particular, the Pezval sum can easily become negative.

The embodiments satisfying conditions (1) to (10) will now be described.

First, the zoom lens system according to the first embodiment comprises, starting from the object side, the first lens group I and the second lens group II. The first lens group I includes the first lens 1 with a positive refractive power and a convex surface facing the object; a second biconcave lens 2 with positive refractive power, a third biconvex lens 3 with a positive refractive power; and a fourth meniscus lens 4 with a positive refractive power and a convex surface facing the image plane. The second lens group II includes a fifth lens 5 with a positive refractive power and a convex surface facing the image plane and a sixth meniscus lens with a negative refractive power and a convex surface facing the image plane.

Data for the first embodiment of the present invention are listed in Table 1 in which the focal length ranges from 36.30 mm to 68.20 mm, and the F number ranges from 5.6 to 10.52.

In the tables below, all units of length are in millimeters and the following variables are used:

r(i=1–15) represents the radius of curvature of a refractive surface;

$d_i$(i=1–15) represents the thickness of a lens or the length between the lens units;

nd represents the d-line refractive index of a lens unit;

ν represents the Abbe number of a lens unit; and

TABLE 1

| Surface number | radius of curvature $r_i$ | Distance $d_i$ | refractive power nd | Abbe number ν |
|---|---|---|---|---|
| 1 | 5.88700 | 2.0000 | 1.49700 | 81.61 |
| 2 | 34.08100 | 1.0400 | | |

TABLE 1-continued

| Surface number | radius of curvature $r_i$ | Distance $d_i$ | refractive power nd | Abbe number ν |
|---|---|---|---|---|
| 3* | −54.88400 | 1.3013 | 1.88300 | 40.80 |
| 4 | 5.18700 | 0.0300 | | |
| 5 | 5.22300 | 1.8400 | 1.48749 | 70.44 |
| 6 | −194.43000 | 0.1800 | | |
| 7 | −23.78300 | 1.3700 | 1.75211 | 26.70 |
| 8 | −9.31000 | 0.9500 | | |
| 9 | ∞ | 0.9000 | | |
| 10 | ∞ | 6.6254–1.4200 | | |
| 11 | −11.51700 | 2.2500 | 1.59551 | 39.22 |
| 12* | −8.73000 | 4.4000 | | |
| 13* | −6.75500 | 0.9000 | 1.72916 | 54.67 |
| 14 | −31.87800 | 7.5239–28.9300 | | | where * represents an aspherical surface. The aspherical lenses of the compact zoom lens system according to the embodiment are described by the following equation.

$$Z=Cy^2/\{1+(1-(k+1)C^2y^2)^{1/2}\}+A4S^4+A6S^6+A8S^8+A10S^{10}$$

wherein,

Z represents the distance from the lens vertex to an optical axis, y represents the radial distance from the optical axis, C represents the inverse radius of curvature, k represents the conic constant, A4, A6, A8, A10 represent aspherical coefficients.

The coefficients of the aspherical lens surface are listed in the following Table 2.

TABLE 2

| | aspherical coefficients the third surface | aspherical coefficients of the twelfth surface | aspherical coefficients of the thirteenth surface |
|---|---|---|---|
| K | 0.8334670923198E + 2 | 0.1069474990118E + 0 | −0.5817071054819E + 0 |
| A4 | −0.1816053564764E − 3 | 0.1342305619121E − 3 | 0.1338778702310E − 3 |
| A6 | 0.7584823996454E − 5 | −0.5051395520200E − 5 | 0.5920959589575E − 6 |
| A8 | −0.6314177143102E − 6 | 0.4306722647175E − 7 | −0.5496570198397E − 7 |
| A10 | 0.4289681474636E − 7 | −0.2645042033705E − 10 | 0.5394800516149E − 9 |

Figure 2C:
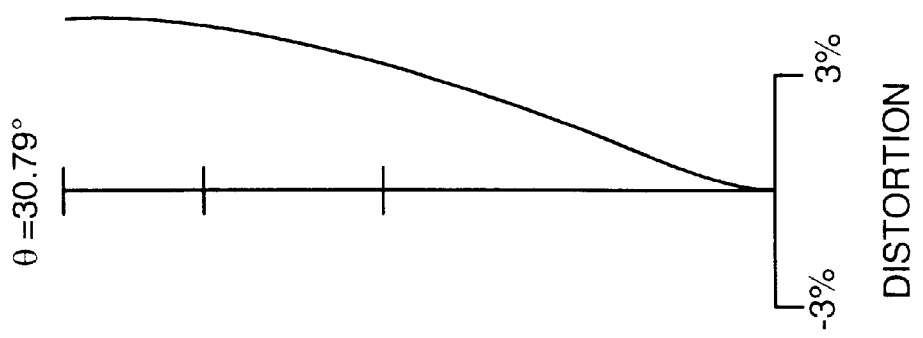
Figure 2B:
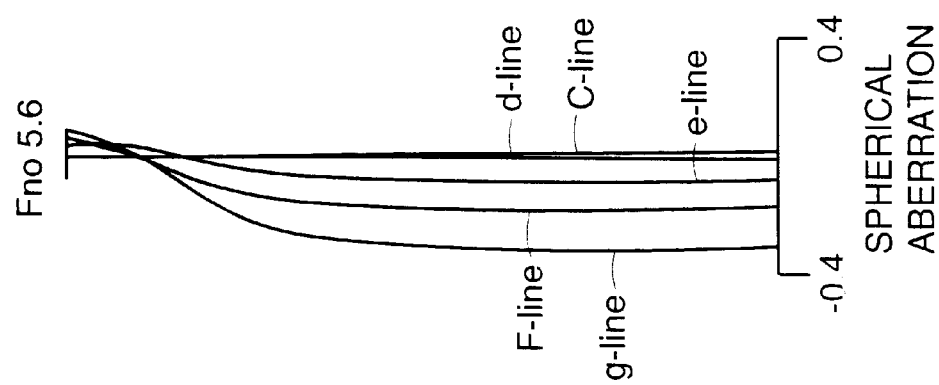
Figure 2A:
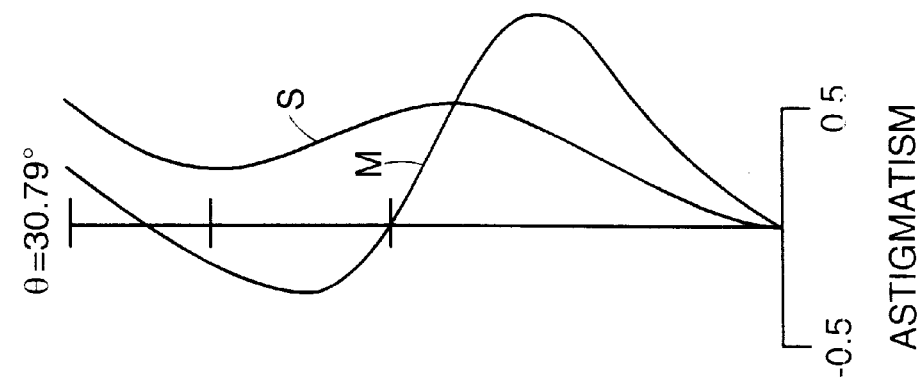

FIGS. 2 and 3 illustrate superior aberration characteristics of the first embodiment at a wide-angle position and a telephoto position, respectively. In FIGS. 2 and 3, the following variables are used: S represents astigmatism in the sagittal direction; M represents astigmatism in the tangential direction; C represents a ray with a wavelength of 656.27 nm; F represents a ray with a wavelength of 486.13 nm; and d represents a ray with a wavelength of 587.56 nm.

The second embodiment of the present invention is described below.

The zoom lens system according to the second embodiment is constructed in the same manner as the zoom lens system of the first embodiment. Data for the second embodiment of the present invention are listed in Table 3 in which the focal length ranges from 36.22 mm to 68.03 mm, and the F number ranges from 4.5 to 8.45.

TABLE 3

| surface number | radius of curvature $r_i$ | distance $d_i$ | Refractive power nd | Abbe number ν |
|---|---|---|---|---|
| 1 | 6.50400 | 1.8100 | 1.49700 | 81.61 |
| 2 | 15.58900 | 1.4300 | | |
| 3* | −88.50400 | 0.8400 | 1.84750 | 43.03 |

TABLE 3-continued

| surface number | radius of curvature $r_i$ | distance $d_i$ | Refractive power nd | Abbe number ν |
|---|---|---|---|---|
| 4 | 6.28400 | 0.0100 | | |
| 5 | 6.28400 | 2.0000 | 1.48749 | 70.44 |
| 6 | −16.20400 | 0.8900 | | |
| 7 | −12.53900 | 1.8100 | 1.75211 | 28.21 |
| 8 | −8.90200 | 1.2000 | | |
| 9 | ∞ | 0.9000 | | |
| 10 | ∞ | 7.1873–1.4400 | | |
| 11 | −26.26700 | 2.7200 | 1.57309 | 42.59 |
| 12* | −12.75800 | 3.6200 | | |
| 13* | −7.73100 | 0.9500 | 1.75500 | 52.32 |
| 14 | −62.19400 | 8.4699–31.4040 | | |

The coefficients of the aspherical lens surface are listed in the following Table 4.

TABLE 4

| | aspherical coefficients the third surface | aspherical coefficients of the twelfth surface | aspherical coefficients of the thirteenth surface |
|---|---|---|---|
| K | 0.9999999999952E + 2 | 0.9921325196762E + 0 | −0.5331818319928E + 0 |
| A4 | −0.2498859204108E − 3 | 0.1109560273763E − 3 | 0.1153374010887E − 3 |
| A6 | −0.2165785814186E − 5 | −0.2590069698044E − 5 | 0.7566266274082E − 6 |
| A8 | −0.4357368236200E − 7 | 0.1589761287230E − 7 | −0.6237312952260E − 7 |
| A10 | 0.2446407999455E − 8 | 0.4394952094461E − 9 | 0.4535111577800E − 9 |

Figure 4C:
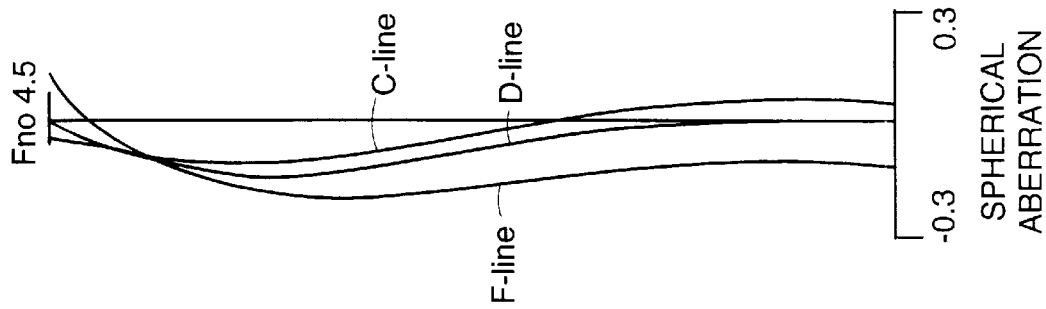
FIG. 4 shows aberration curves of a compact zoom lens system according to a second embodiment of the present invention at the wide-angle position.
Figure 4B:
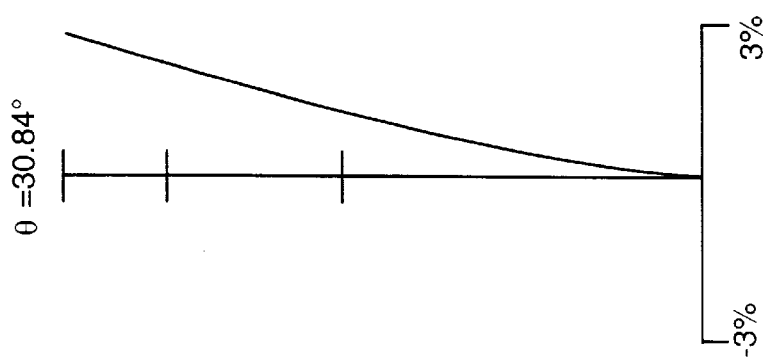
Figure 4A:
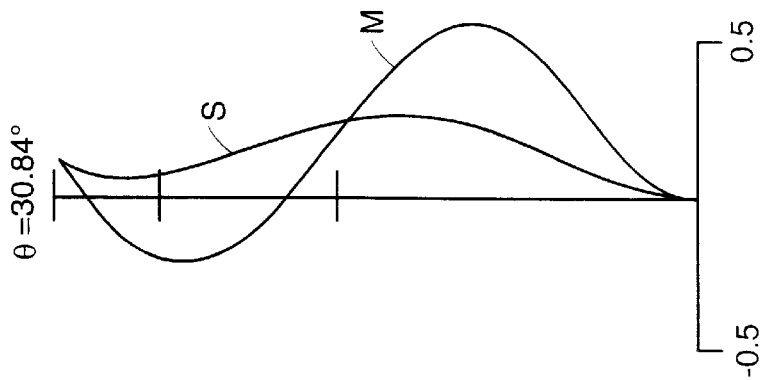

FIGS. 4 and 5 illustrate superior aberration characteristics of the second embodiment at the wide-angle position and the telephoto position, respectively.

The third embodiment of the present invention is described below.

Figure 6A:
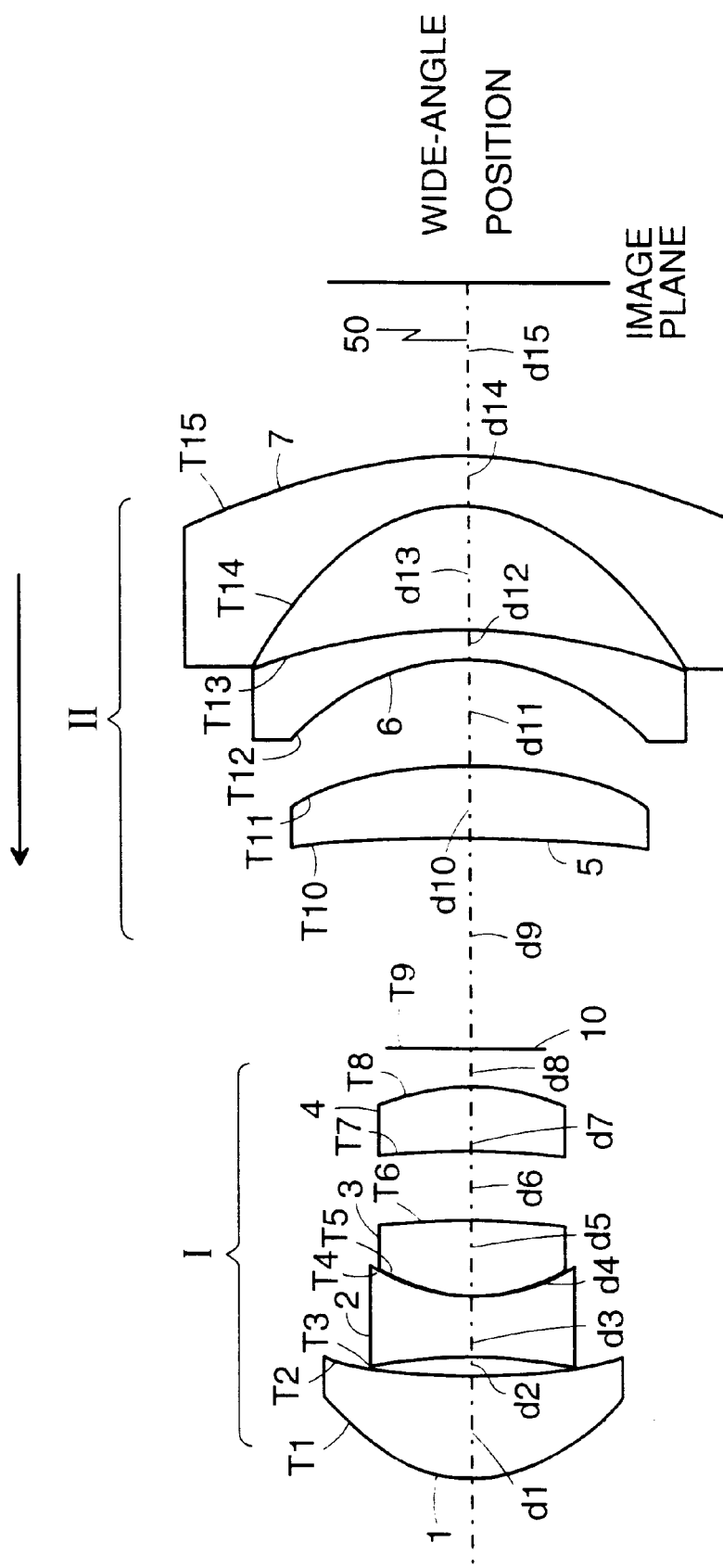
FIG. 6a is a side view of the third embodiment of the compact zoom lens system of the present invention at the wide-angle position; the arrow above lens group II indicates the motion of lens group II, relative to lens group I, required to achieve the telephoto position shown in FIG. 6B.

As shown in FIGS. 6a and 6b, the zoom lens system according to the third embodiment is constructed in the same manner as the zoom lens system of the first embodiment described above, with the exception that the second lens group II further includes a seventh lens 7 with a negative refractive power and a convex surface facing the image plane. The seventh lens is positioned on the image plane side of the sixth lens 6. Further, the second embodiment does not have the mirror 11 of the first and second embodiments.

Data for the third embodiment of the present invention are listed in Table 5 in which the focal length ranges from 36.61 mm to 68.39 mm, and the F number ranges from 6.0 to 11.2.

TABLE 5

| surface number | radius of curvature $r_i$ | distance $d_i$ | Refractive power nd | Abbe number ν |
|---|---|---|---|---|
| 1* | 5.71200 | 2.0000 | 1.50459 | 56.20 |
| 2 | 38.41600 | 0.3400 | | |
| 3 | −30.14700 | 1.9100 | 1.88300 | 40.80 |
| 4* | 5.10100 | 0.0400 | | |

TABLE 5-continued

| surface number | radius of curvature $r_i$ | distance $d_i$ | Refractive power nd | Abbe number ν |
|---|---|---|---|---|
| 5 | 5.16800 | 2.0000 | 1.49700 | 81.61 |
| 6 | −19.73900 | 1.0500 | | |
| 7 | −78.55700 | 1.5700 | 1.67741 | 28.52 |
| 8 | −10.48300 | 0.7300 | | |
| 9 | ∞ | 0.9000 | | |
| 10 | −29.24000 | 4.2469–1.7010 | 1.67741 | 28.52 |
| 11* | −11.66100 | 1.8500 | | |
| 12 | −7.24700 | 1.5400 | 1.88300 | 40.80 |
| 13 | −19.24300 | 1.1000 | | |
| 14 | −7.08300 | 2.2500 | 1.88300 | 40.80 |
| 15 | −13.19500 | 9.1236–29.0400 | | |

The coefficients of the aspherical lens surface are listed in the following Table 6.

TABLE 6

| | aspherical coefficients the first surface | aspherical coefficients of the fourth surface | aspherical coefficients of the eleventh surface |
|---|---|---|---|
| K | 0.1271064343345E + 0 | −0.4448715758122E + 0 | 0.2150331029324E + 1 |
| A4 | −0.7032027461866E − 4 | 0.6288996000037E − 3 | −0.2729760725705E − 3 |
| A6 | −0.7572450455504E − 6 | 0.1154155508068E − 4 | 0.3538484186078E − 5 |
| A8 | −0.3300966382838E − 7 | 0.4808026726681E − 6 | −0.4337401490817E − 6 |
| A10 | | −0.3713177367179E − 7 | 0.7246317682542E − 8 |

Figure 7C:
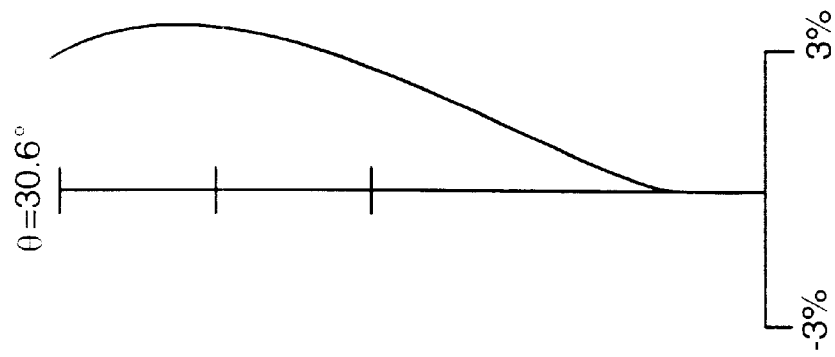
Figure 7B:
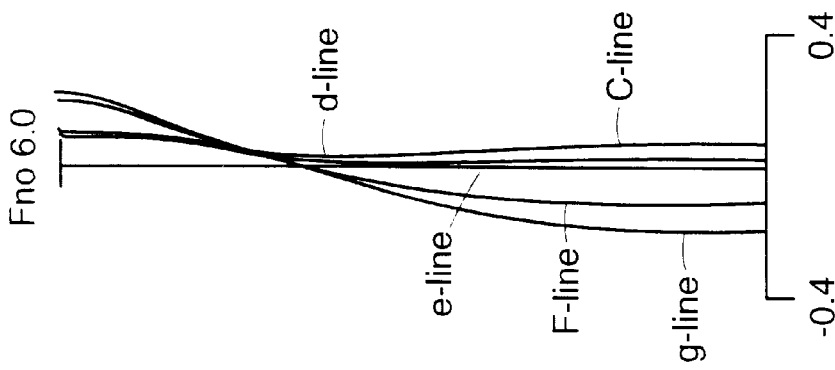
Figure 7A:
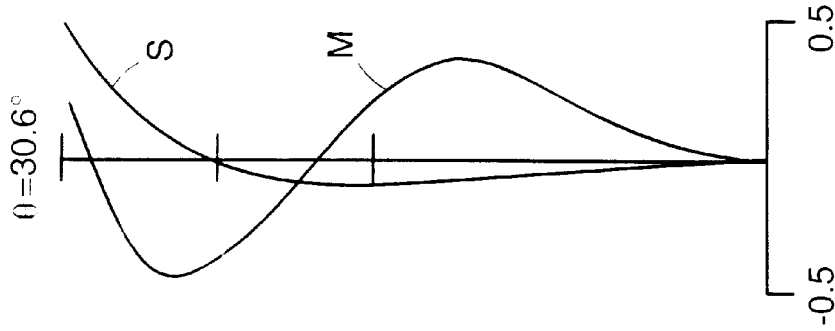

FIGS. 7 and 8 illustrate superior aberration characteristics of the third embodiment at the wide-angle position and the telephoto position, respectively.

The fourth embodiment of the present invention is described below.

The zoom lens system according to the fourth embodiment is constructed in the same manner as the zoom lens system of the third embodiment.

Data for the fourth embodiment of the present invention are listed in Table 7 in which the focal length ranges from 36.49 mm to 90.00 mm, and the F number ranges from 5.2 to 12.8.

TABLE 7

| surface number | radius of curvature $r_i$ | distance $d_i$ | Refractive power nd | Abbe number ν |
|---|---|---|---|---|
| 1* | 6.95300 | 2.0000 | 1.48749 | 70.44 |
| 2 | −25.83900 | 0.1000 | | |
| 3* | −30.07300 | 2.5900 | 1.88300 | 40.80 |
| 4 | 9.89900 | 0.4300 | | |
| 5 | 45.12200 | 1.7000 | 1.49700 | 81.61 |
| 6 | −11.86400 | 0.5100 | | |
| 7 | −25.35600 | 1.5600 | 1.67741 | 32.21 |
| 8 | −10.46300 | 0.9500 | | |
| 9 | ∞ | 5.3867–1.5000 | | |
| 10 | −10.87500 | 1.9500 | 1.67741 | 31.27 |
| 11* | −6.49300 | 1.1800 | | |
| 12* | −6.42700 | 0.7800 | 1.88300 | 40.80 |
| 13 | −13.04400 | 4.3000 | | |
| 14 | −7.31200 | 0.8000 | 1.88300 | 40.80 |
| 15 | −14.28800 | 8.4596–42.4900 | | |

The coefficients of the aspherical lens surfaces are listed in the following Table 8.

TABLE 8

| | aspherical coefficients the first surface | aspherical coefficients of the third surface |
|---|---|---|
| K | −0.8336298835226E + 0 | 0.1059619117971E + 2 |
| A4 | 0.3353893001065E − 3 | −0.1605292773476E − 4 |
| A6 | 0.2741861591732E − 5 | 0.5825004555094E − 5 |
| A8 | −0.3464217528510E − 7 | 0.1294941007645E − 6 |
| A10 | 0.2783582870691E − 8 | −0.1864891919182E − 8 |

| | aspherical coefficients the eleventh surface | aspherical coefficients of the twelfth surface |
|---|---|---|
| K | −0.8662161808031E + 0 | −0.1036047575356E + 1 |
| A4 | 0.1689435762731E − 3 | 0.2214599244265E − 3 |
| A6 | −0.1901157907865E − 5 | 0.3340327582995E − 5 |
| A8 | −0.2696571028881E − 7 | 0.2659042632085E − 7 |
| A10 | 0.2820752272382E − 9 | 0.4467926865585E − 10 |

Figure 9C:
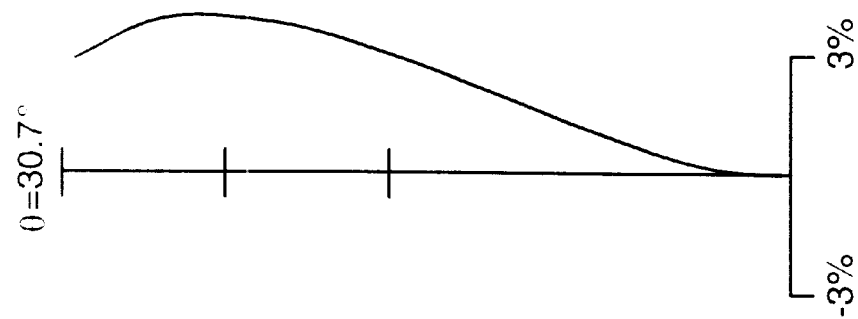
FIG. 9 shows aberration curves of a compact zoom lens system according to a fourth embodiment of the present invention at the wide-angle position.
Figure 9B:
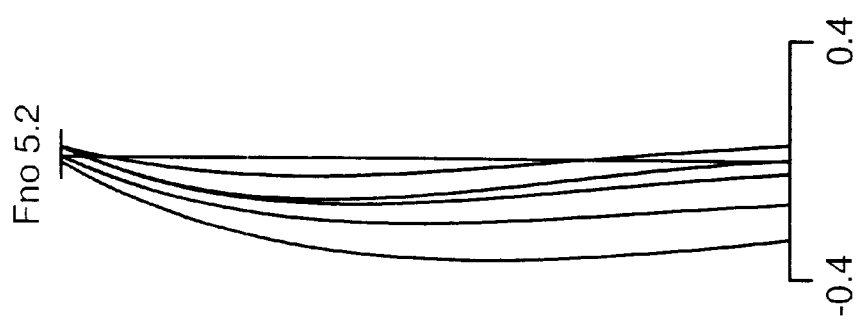
Figure 9A:
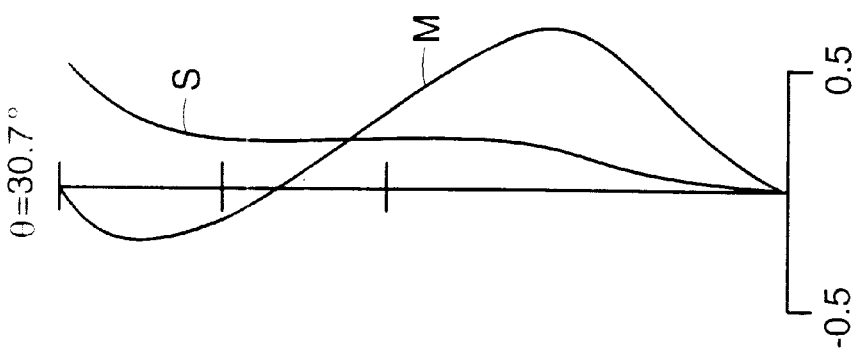

FIGS. 9 and 10 illustrate superior aberration characteristics of the fourth embodiment at the wide-angle position and the telephoto position, respectively.

The fifth embodiment of the present invention is described below.

The zoom lens system according to the fifth embodiment is constructed in the same manner as the zoom lens system of the third embodiment.

Data for the fifth embodiment of the present invention are listed in Table 9 in which the focal length ranges from 36.37 mm to 68.18 mm, and the F number ranges from 5.60 to 10.50

TABLE 9

| surface number | radius of curvature $r_i$ | distance $d_i$ | Refractive power nd | Abbe number ν |
|---|---|---|---|---|
| 1 | 6.88800 | 2.0000 | 1.51823 | 58.96 |
| 2 | 57.47600 | 0.4000 | | |
| 3 | −22.88300 | 2.1400 | 1.88300 | 40.80 |
| 4* | 6.93200 | 0.0600 | | |
| 5 | 7.69700 | 1.8600 | 1.49700 | 81.61 |
| 6 | −15.64300 | 1.5700 | | |
| 7 | 204.29100 | 1.5800 | 1.61650 | 30.96 |
| 8 | −11.43100 | 0.7800 | | |
| 9 | ∞ | 4.3212–1.7010 | | |
| 10 | −24.89700 | 1.8500 | 1.67742 | 28.52 |
| 11* | −12.63700 | 1.9000 | | |
| 12 | −7.73000 | 1.1700 | 1.88300 | 40.80 |
| 13 | −19.12300 | 2.2500 | | |
| 14 | −7.37000 | 1.5000 | 1.88300 | 40.80 |
| 15 | −13.35300 | 9.2869–30.0200 | | |

The coefficients of the aspherical lens surfaces are listed in the following Table 10.

TABLE 10

| | aspherical coefficients the fourth surface | aspherical coefficients of the eleventh surface |
|---|---|---|
| K | −0.6375517646800E+0 | 0.1291300223881E+1 |
| A4 | 0.2938219693312E−3 | −0.2119376200650E−3 |
| A6 | −0.5878737014447E−5 | −0.2308779558233E−5 |
| A8 | 0.9549890176543E−6 | −0.1169994612825E−6 |
| A10 | −0.560901 9097605E−7 | 0.6408158759698E−9 |

Figure 11C:
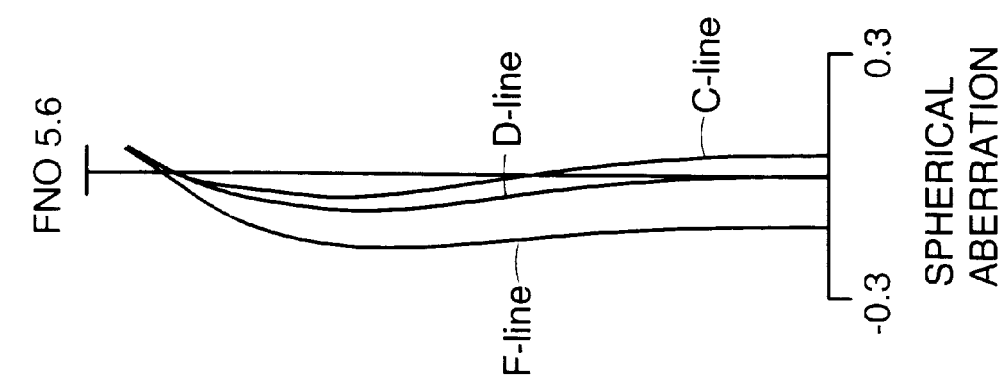
FIG. 11 shows aberration curves of a compact zoom lens system according to a fifth embodiment of the present invention at the wide-angle position.
Figure 11B:
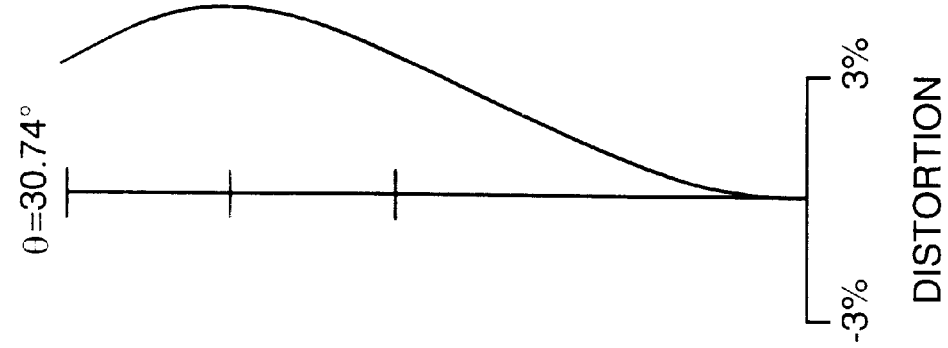
Figure 11A:
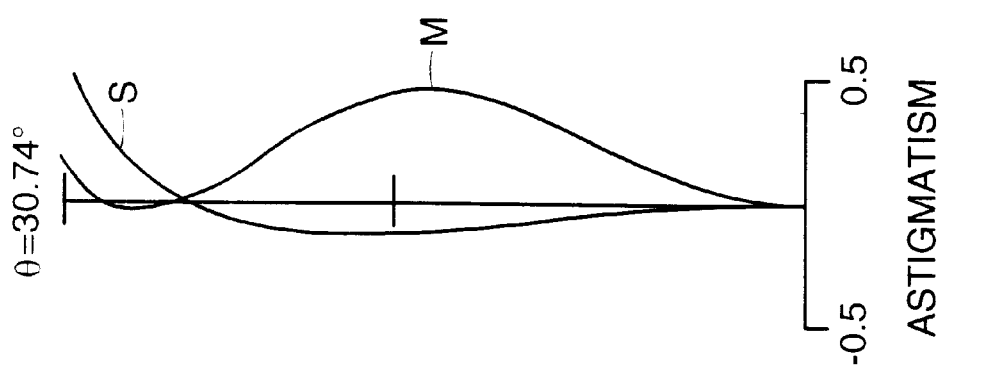
Figure 12C:
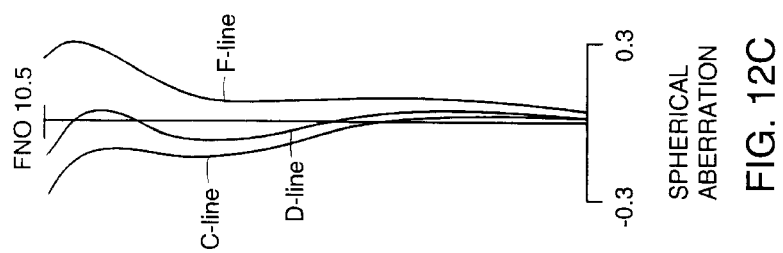
FIG. 12 shows aberration curves of the compact zoom lens system according to the fifth embodiment of the present invention at the telephoto position.
Figure 12B:
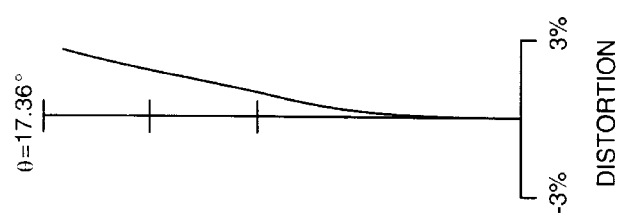
Figure 12A:
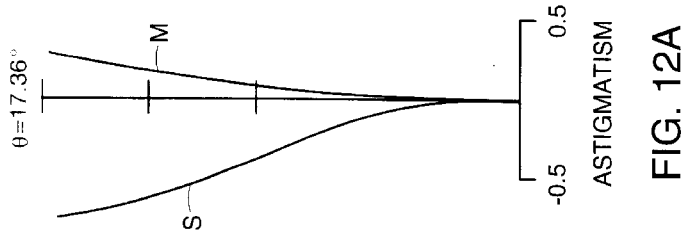
Figure 13A:
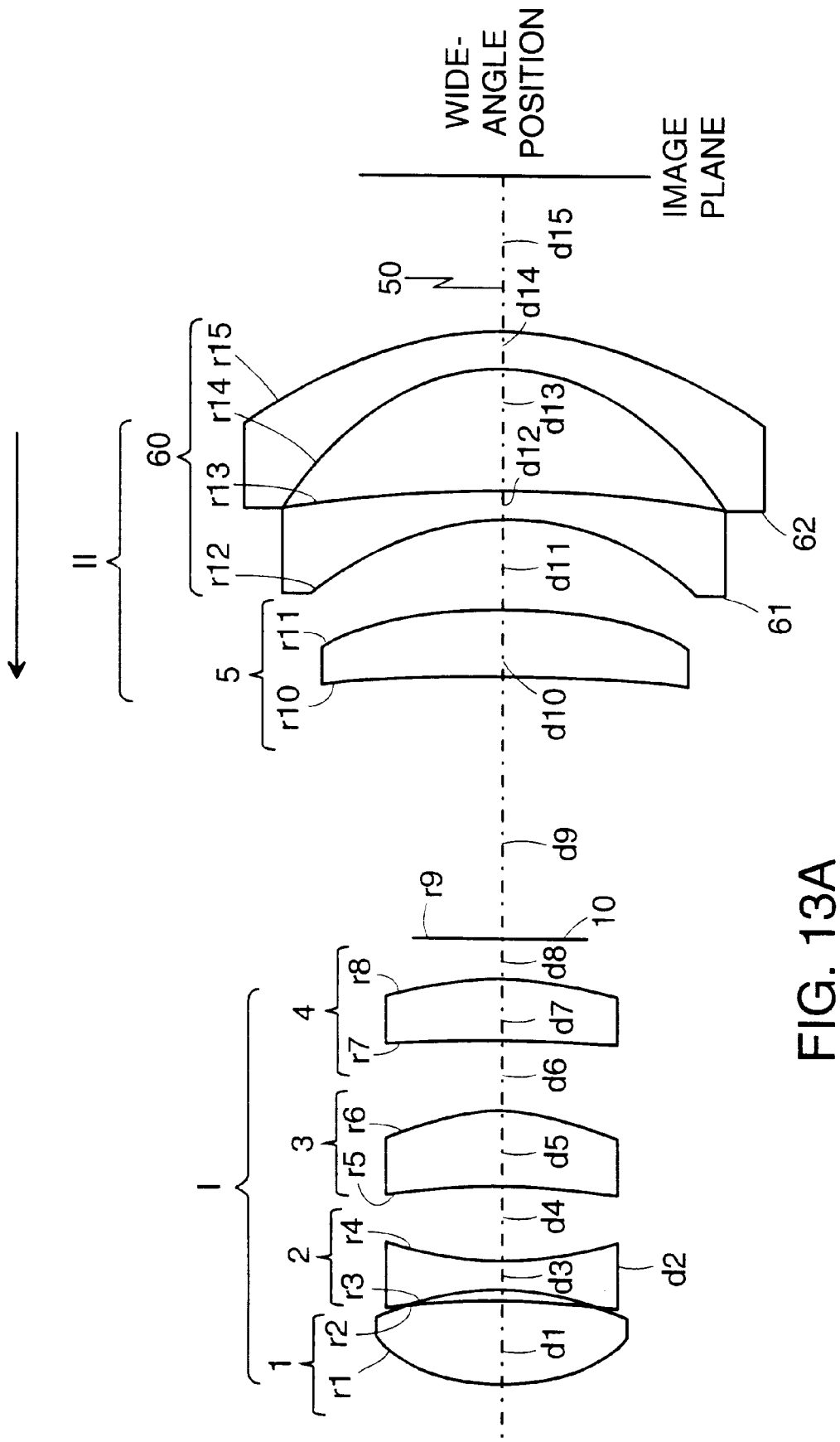
FIG. 13a is a side view of a sixth embodiment of the compact zoom lens system of the present invention at the wide-angle position; the arrow above lens group II indicates the motion of lens group II, relative to lens group I, required to achieve the telephoto position shown in FIG. 13B.
Figure 13B:
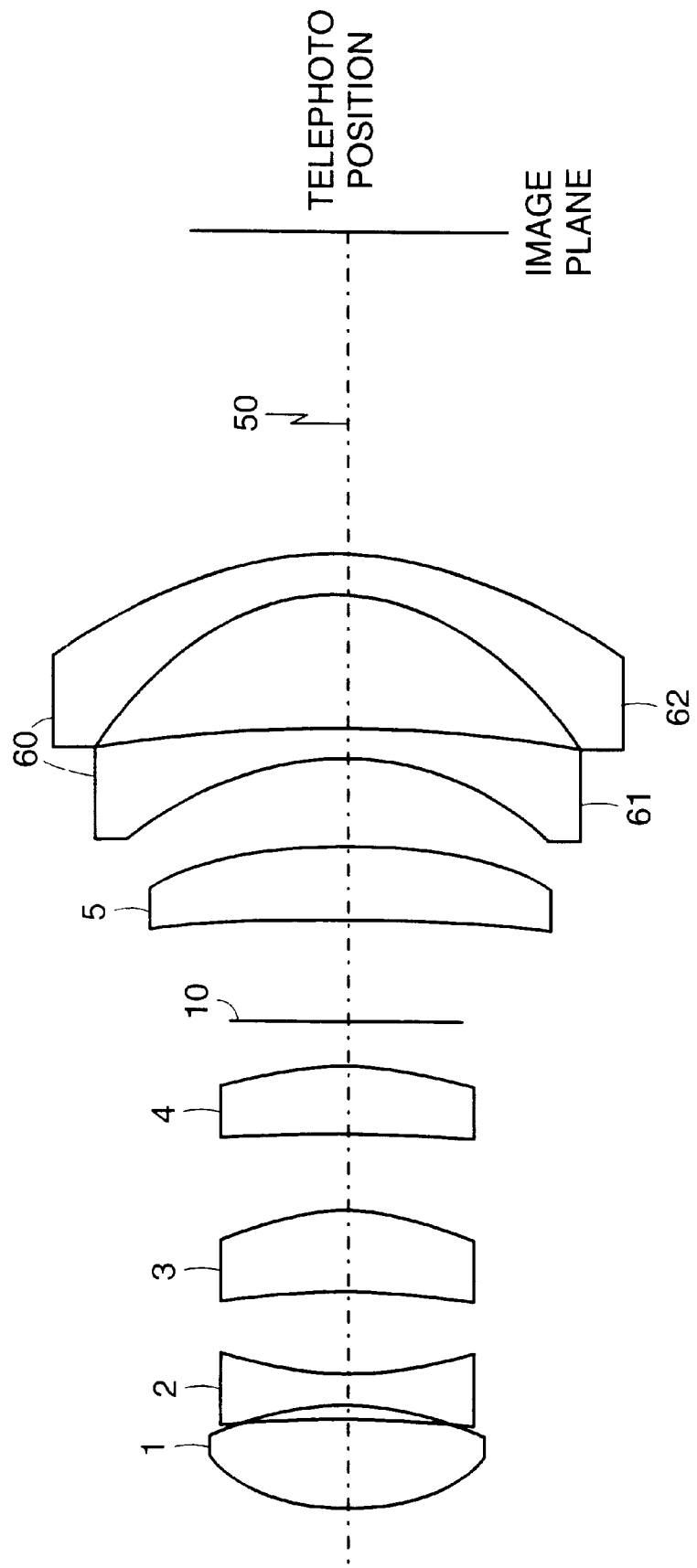
FIG. 13b is a side view of the compact zoom lens system of FIG. 13a at the telephoto position.

FIGS. 11 and 12 illustrate superior aberration characteristics of the fifth embodiment at the wide-angle position and the telephoto position, respectively.

The sixth embodiment of the present invention is described below.

The zoom lens system according to the sixth embodiment is constructed in the same manner as the zoom lens system of the third embodiment, with the exception that the third lens 3 of the first lens group I is a meniscus lens with a positive refractive power and a convex surface facing the image plane.

Data for the sixth embodiment of the present invention are listed in Table 11 in which the focal length ranges from 36.68 mm to 87.92 mm, and the F number ranges from 5.05 to 12.10

TABLE 11

| surface number | radius of curvature $r_i$ | distance $d_i$ | Refractive power nd | Abbe number ν |
|---|---|---|---|---|
| 1* | 8.01600 | 2.0000 | 1.48749 | 70.44 |
| 2 | −27.21500 | 0.1300 | | |
| 3* | −18.23600 | 0.9800 | 1.88300 | 40.80 |
| 4 | 14.50100 | 1.6100 | | |
| 5 | −31.63800 | 1.7000 | 1.48749 | 70.44 |
| 6 | −9.50700 | 1.5200 | | |
| 7 | −171.73800 | 1.5600 | 1.59270 | 35.45 |
| 8 | −14.55300 | 0.9500 | | |
| 9 | ∞ | 6.0966–1.5000 | | |
| 10 | −96.90100 | 1.9500 | 1.68893 | 31.16 |
| 11* | −16.78400 | 1.9000 | | |
| 12 | −11.08200 | 0.7800 | 1.88300 | 40.80 |
| 13 | −52.60200 | 2.7700 | | |
| 14 | −8.77500 | 0.8000 | 1.88300 | 40.80 |
| 15 | −16.57200 | 10.1195–30.0200 | | |

The coefficients of the aspherical lens surfaces are listed in the following Table 12.

TABLE 12

|  | aspherical coefficients the first surface | aspherical coefficients of the third surface | aspherical coefficients of the eleventh surface |
|---|---|---|---|
| K | −0.9146878419062E+0 | 0.7981015841760E+1 | 0.1061813026359E+1 |
| A4 | −0.2498859204108E−3 | 0.1528856126699E−4 | −0.7613346094257E−4 |
| A6 | −0.2536205575520E−6 | 0.3062646493031E−5 | −0.1864103340148E−5 |
| A8 | 0.1127943378320E−6 | 0.2382370894417E−6 | 0.7153711129008E−8 |
| A10 | −0.7621912839498E−8 | −0.2957051619044E−8 | −0.3230579788491E−11 |

Figure 14C:
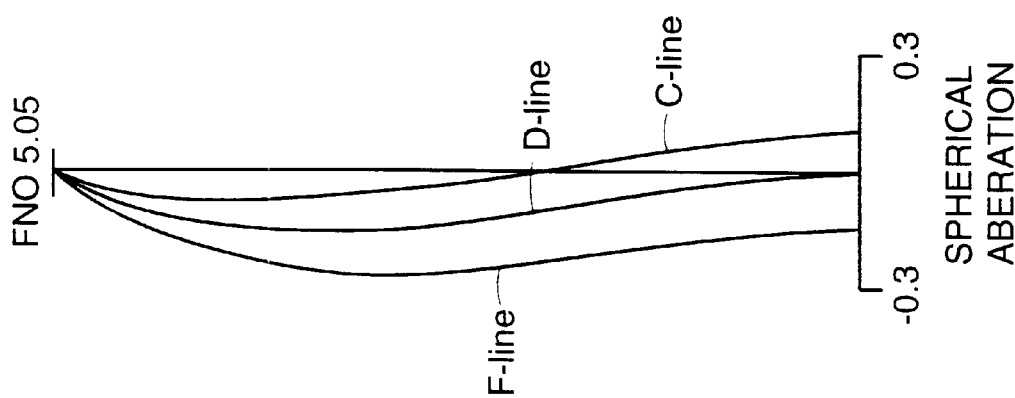
Figure 14B:
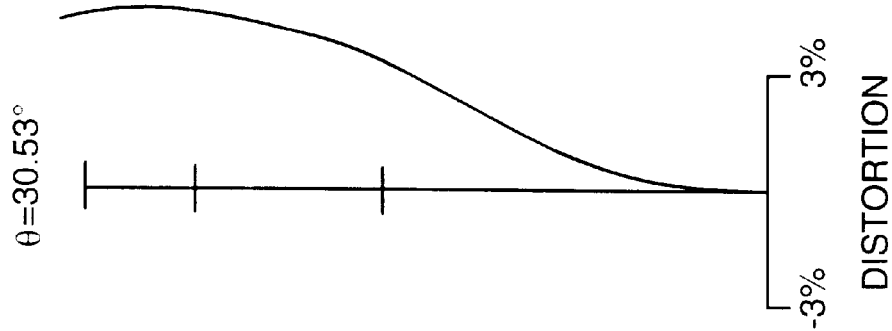
Figure 14A:
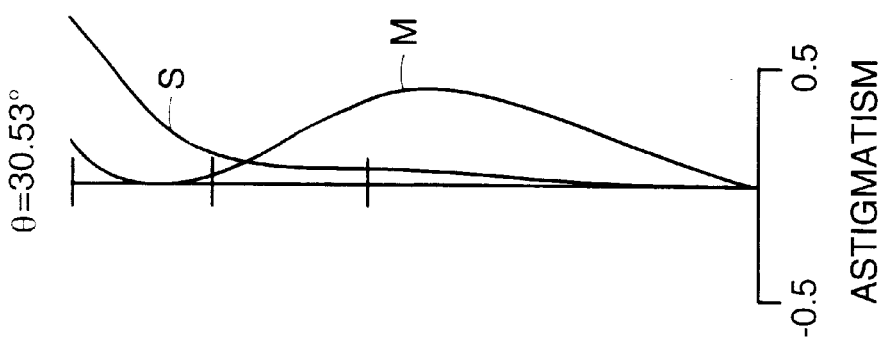
Figure 15C:
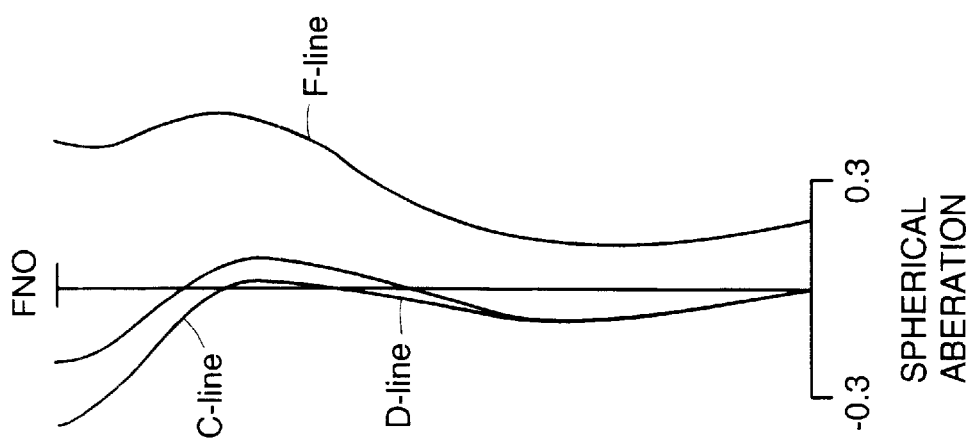
FIG. 15 shows aberration curves of the compact zoom lens system of FIG. 13b.
Figure 15B:
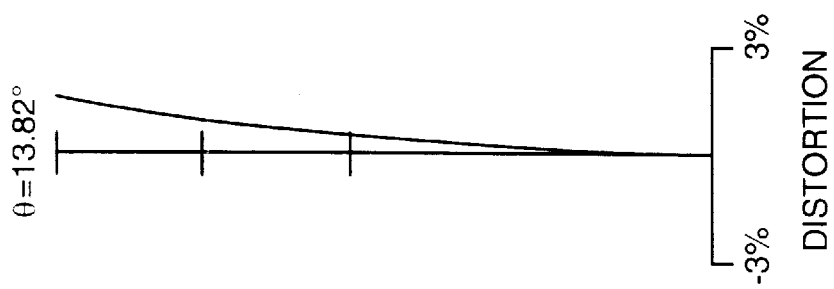
Figure 15A:
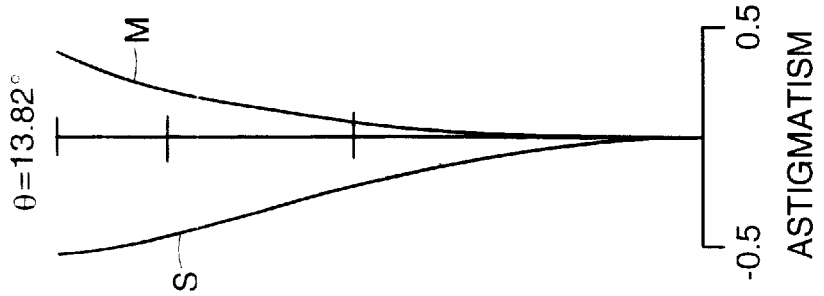

FIGS. 14 and 15 illustrate superior aberration characteristics of the sixth embodiment at the wide-angle position and the telephoto position, respectively.

Values for conditions corresponding to the first to sixth embodiments of the present invention are expressed in the following Table 13.

TABLE 13

|  | first embodiment | second embodiment | third embodiment |
|---|---|---|---|
| Lt/ft | 0.6965 | 0.7500 | 0.7109 |
| f1/fw | 0.6760 | 0.6861 | 0.4886 |
| \|f2\|/f1 | 0.6710 | 0.7210 | 0.6270 |
| X/fw | 04.218 | 0.4109 | 0.4684 |
| Ldw/fw | 0.6553 | 0.7004 | 0.6044 |
| Ldw/LY | 0.5499 | 0.5864 | 0.5115 |
| \|f2\|/fw | 0.4530 | 0.4950 | 0.3060 |
| \|f2\| Zr | 30.9300 | 33.6841 | 20.9400 |
| f1/LY | 0.5672 | 0.5744 | 0.4136 |
| f1/ft | 0.3598 | 0.3653 | 0.2616 |
| βt | 2.7790 | 2.7380 | 3.8220 |
| \|f2\|/LY | 0.3810 | 0.4140 | 0.2590 |
| dw/fw | 0.2335 | 0.2564 | 0.1359 |
| fbw/LY | 0.6686 | 0.7259 | 0.6713 |
| \|f2\|/ft | 0.2410 | 0.2630 | 0.1640 |

|  | fourth embodiment | fifth embodiment | sixth embodiment |
|---|---|---|---|
| Lt/ft | 0.6983 | 0.7447 | 0.7489 |
| f1/fw | 0.5308 | 0.4871 | 0.5565 |
| \|f2\|/f1 | 0.6360 | 0.6510 | 0.6940 |
| X/fw | 0.5168 | 0.5026 | 0.4826 |
| Ldw/fw | 0.6644 | 0.6429 | 0.6746 |
| Ldw/LY | 0.5605 | 0.5405 | 0.5720 |
| \|f2\|/fw | 0.3380 | 0.3170 | 0.3860 |
| \|f2\| Zr | 30.3800 | 21.6131 | 33.9372 |
| f1/LY | 0.4478 | 0.4095 | 0.4719 |
| f1/ft | 0.2152 | 0.2598 | 0.2322 |
| βt | 4.6470 | 3.8480 | 4.3060 |
| \|f2\|/LY | 0.2850 | 0.2660 | 0.3280 |
| dw/fw | 0.1476 | 0.1403 | 0.1921 |
| fbw/LY | 0.9822 | 0.6939 | 1.0562 |
| \|f2\|/ft | 0.1370 | 0.1690 | 0.1610 |

The embodiments of the present invention as described above provide a compact zoom lens system which is lightweight and has a magnification ratio of 2.0 and has a telephoto ratio of less than 0.78 at the telephoto position.

The zoom lens system according to the present invention has an improved performance because a mirror having an outside diameter equal to that of the clear aperture blocks harmful peripheral rays in the zoom lens system.

The zoom lens system according to the present invention can be made very short because the zoom lens system includes more than three aspherical surfaces, which compensate for the diminished performance of the zoom lens system.

Also, the travel of the lens groups decreases because the zoom lens system of the present invention is considerably shorter at both the wide-angle and the telephoto positions. Consequently, a smaller actuator (not shown) is required for adjusting the zoom lens system, so that a camera with a compact zoom lens system of this type can be very compact.

While this invention has been described in connection with what are presently considered to be the most practical and preferred embodiments, it is to be understood that the invention is not limited to the disclosed embodiments, but can also cover various modifications and equivalent arrangements without deviating from the spirit and scope of the claims.

What is claimed is:

1. A compact zoom lens system for imaging an object in an image plane, the lens system when viewed from the object side, comprising:

a first lens group with a positive refractive power; and a second lens group with a negative refractive power, the magnification of the system being changed between a wide-angle position and a telephoto position by decreasing the distance between the first and second lens groups, as the distance is increased between the first lens group and the image plane of the compact zoom lens, wherein the compact zoom lens system satisfies the following condition:

$$Lt/ft < 0.78$$

wherein,

Lt is the a distance between the surface facing the object of the lens closest to the object of the first lens group and the image plane at the telephoto position, and ft is the a focal length of the zoom lens system at the telephoto position.

2. The compact zoom lens system of claim 1, wherein the compact zoom lens system further satisfies the following condition:

$$0.40 < f1/fw < 0.70$$

wherein, f1 is the focal length of the first lens group, and fw is the focal length of the zoom lens system at the wide-angle position.

3. The compact zoom lens system of claim 1, wherein the compact zoom lens system further satisfies the following condition:

$$0.28 < |f2|/fw < 0.46$$
$$\text{with } f2 < 0$$

wherein, f2 is the focal length of the second lens group and fw is the focal length of the zoom lens system at the wide-angle position.

4. The compact zoom lens system of claim 1, wherein the compact zoom lens system further satisfies the following condition:

$$0.55<|f2|/f1<0.80$$

with $f2<0$ wherein f1 is the focal length of the first lens group and f2 is the focal length of the second lens group.

5. The compact zoom lens system of claim 1, wherein the compact zoom lens system further satisfies the following condition:

$$0.55<Ldw/fw<0.75$$

wherein,

Ldw is the distance between the surface facing the object of the lens closest to the object of the first lens group and the surface facing the image plane of the lens closest to the image plane of the second lens group at the wide-angle position, and fw is the focal length of the zoom lens system at the wide-angle position.

6. The compact zoom lens system of claim 1, wherein the compact zoom lens system further satisfies the following condition:

$$0.45<Ldw/LY<0.65$$

wherein,

LY is the maximum height of image in the image plane and

Ldw is the distance between the surface facing the object of the lens closest to the object of the first lens group and the surface facing the image plane of the lens closest to the image plane of the second lens group at the wide-angle position.

7. The compact zoom lens system of claim 1, wherein the compact zoom lens system further satisfies the following condition:

$$0.20<|f2|/LY<0.40$$

wherein, f2 is the focal length of the second lens group and

LY is the maximum height of image in the image plane.

8. The compact zoom lens system of claim 1, wherein the compact zoom lens system further satisfies the following condition:

$$16.0<|f2|\times Zr<31.0$$

wherein,

Zr is the zoom ratio and f2 is the focal length of the second lens group.

9. The compact zoom lens system of claim 1, wherein the compact zoom lens system further satisfies the following condition:

$$0.38<X/fw<0.52$$

wherein,

X is the distance between the surface facing the object of the lens closest to the object of the first lens group and the surface facing the image plane of the lens closest to the image plane of the second lens group at the wide-angle position minus the distance separating the first lens group from the second lens group, and fw is the focal length of the zoom lens system at the wide-angle position.

10. The compact zoom lens system of claim 1, wherein the compact zoom lens system further satisfies the following condition:

$$3.60<\beta t<5.0$$

wherein, $\beta t$ is the magnification at the telephoto position.

11. The compact zoom lens system of claim 1, further comprising an aperture positioned between the first lens group and the second lens group, and a mirror for blocking light received at a periphery of the zoom lens system wherein the mirror is positioned on the side of the aperture facing the image plane.

12. The compact zoom lens system of claim 1, wherein the compact zoom lens system further satisfies the following condition:

$$0.18<f1/ft<0.28$$

wherein f1 is the focal length of the first lens group.

13. The compact zoom lens system of claim 1, wherein the compact zoom lens system further satisfies the following condition:

$$0.11<dw/fw<0.25$$

wherein, dw is the distance between the first lens group and the second lens group at the wide-angle position, and fw is the focal length of the zoom lens system at the wide-angle position.

14. The compact zoom lens system of claim 1, wherein the compact zoom lens system further satisfies the following condition:

$$0.55<fbw/LY<1.0$$

wherein fbw is the back focal length at the wide-angle position, and

LY is the maximum height of image in the image plane.

15. The compact zoom lens system of claim 1, wherein the compact zoom lens system further satisfies the following condition:

$$0.36<f1/LY<0.58$$

wherein f1 is the focal length of the first lens group and

LY is the maximum height of image in the image plane.

16. The compact zoom lens system of claim 1, wherein the compact zoom lens system further satisfies the following condition:

$$0.10<|f2|/ft<0.25$$

wherein f2 is the focal length of the second lens group.

17. The compact zoom lens system of claim 1, the first lens group comprising:

a first lens which has a convex surface facing the object and a positive refractive power, a second biconcave lens with a negative refractive power, a third lens which has a convex surface facing the image plane and a positive power, and a fourth meniscus lens which has a convex surface facing the image plane and a positive refractive power; and the second lens group comprising:

a fifth meniscus lens which has a convex surface facing the image side and has positive refractive power, and a sixth meniscus lens which has a convex surface facing the image plane and a negative refractive power.

18. The compact zoom lens system of claim 17 wherein the second lens group further comprises a seventh meniscus lens unit which has a concave surface facing the image side and a negative refractive power.

19. A compact zoom lens system for imaging an object in an image plane, the lens system when viewed from the object side, comprising:

a first lens group with a of positive refractive power, the first lens group comprising a first lens with a positive refractive power, a second lens with a negative refractive power, a third lens with a positive refractive power and a fourth lens with a positive refractive power; and a second lens group with a negative refractive power, the second lens group comprising a fifth lens with a positive refractive power and at least one additional lens with a negative refractive power;

wherein the magnification of the zoom lens system is changed between a wide-angle position and a telephoto position by decreasing the distance between the first lens group and the second lens group, as the distance is increased between the first lens group and the image plane of the compact zoom lens, and wherein the compact zoom lens system includes at least three aspherical surfaces and satisfies the following condition:

$$Lt/ft < 0.78$$

wherein, $Lt$ is the distance between the surface facing the object of the lens closest to the object of the first lens group and the image plane at the telephoto position, and $ft$ is the a focal length of the zoom lens system at the telephoto position.

20. The compact zoom lens system of claim 19, the second lens group further comprising a fifth lens with a positive refractive power, a sixth lens with a negative refractive power and a seventh lens with a negative refractive power.

* * * * *